(12) United States Patent
Li et al.

(10) Patent No.: US 11,745,110 B2
(45) Date of Patent: Sep. 5, 2023

(54) TEAMMATE RECOMMENDATION METHOD FOR A MULTIPLAYER ONLINE GAME

(71) Applicant: Acer Incorporated, New Taipei (TW)

(72) Inventors: Chun-Hsien Li, New Taipei (TW);
Sheng-Wei Chu, New Taipei (TW);
Chia-Shang Yuan, New Taipei (TW);
Jun-Hong Chen, New Taipei (TW);
Te-Chung Huang, New Taipei (TW);
Tsung-Hsien Tsai, New Taipei (TW);
Yueh-Yarng Tsai, New Taipei (TW);
Pin-Cyuan Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 163 days.

(21) Appl. No.: 17/308,209

(22) Filed: May 5, 2021

(65) Prior Publication Data
US 2022/0266152 A1    Aug. 25, 2022

(30) Foreign Application Priority Data

Feb. 24, 2021 (TW) .................................. 110106462

(51) Int. Cl.
*A63F 13/795* (2014.01)
*A63F 13/35* (2014.01)

(52) U.S. Cl.
CPC ............ *A63F 13/795* (2014.09); *A63F 13/35* (2014.09)

(58) Field of Classification Search
CPC ........ A63F 13/80; A63F 13/798; A63F 13/46; A63F 13/35; A63F 13/795
(Continued)

(56) References Cited

U.S. PATENT DOCUMENTS 8,827,812 B2    9/2014  Otomo et al.
10,341,162 B2 *  7/2019  Zou .......................... F41J 5/00
(Continued)

FOREIGN PATENT DOCUMENTS

| CN | 111330286 A | 6/2020 |
| CN | 112148393 A | 12/2020 |
| TW | I389722 B | 3/2013 |

OTHER PUBLICATIONS

Chinese language office action dated Mar. 23, 2022, issued in application No. TW 110106462.
(Continued)

*Primary Examiner* — Michael A Cuff
(74) *Attorney, Agent, or Firm* — McClure, Qualey & Rodack, LLP

(57) ABSTRACT

A teammate recommendation method for a multiplayer online game is proposed. The teammate recommendation method includes the steps of: determining one or more characteristic values for each of a plurality of players based on past game performance information of the players; dividing the players into a plurality of groups based on the characteristic values of the players; determining a Key Performance Indicator (KPI) for each of a plurality of combinations of the groups based on teammate information and team ranking of each game in the past game performance information; selecting one of the combinations, which includes a first group that the first player belongs to, based on the KPIs of the combinations; and recommending one or more second players based on the selected combination.

9 Claims, 8 Drawing Sheets

(58) Field of Classification Search
USPC .......................................................... 463/42
See application file for complete search history.

(56) References Cited

U.S. PATENT DOCUMENTS

| | | | |
|---|---|---|---|
| 2015/0038233 | A1 | 2/2015 | Rom et al. |
| 2016/0001181 | A1 | 1/2016 | Marr et al. |
| 2017/0116525 | A1 | 4/2017 | Pinel et al. |
| 2017/0235848 | A1 | 8/2017 | van Dusen et al. |
| 2019/0091541 | A1 | 3/2019 | Schulte et al. |
| 2021/0086089 | A1* | 3/2021 | Pardeshi ................ A63F 13/85 |
| 2022/0032195 | A1* | 2/2022 | Wan .................... A63F 13/5372 |
| 2022/0047947 | A1* | 2/2022 | Kmita .................. A63F 13/537 |

OTHER PUBLICATIONS

European Search Report dated Oct. 20, 2021, issued in application No. EP 21171845.7.
European Office Action dated Jul. 6, 2023, issued in application No. EP 21171845.7.

\* cited by examiner

TEAMMATE RECOMMENDATION METHOD FOR A MULTIPLAYER ONLINE GAME

CROSS REFERENCE TO RELATED APPLICATIONS

This Application claims priority of Taiwan Patent Application No. 110106462, filed on Feb. 24, 2021, the entirety of which is incorporated by reference herein.

BACKGROUND OF THE APPLICATION

Field of the Application

The application generally relates to statistics-based recommendation techniques, and more particularly, to a teammate recommendation method for a multiplayer online game.

Description of the Related Art

The advances in ubiquitous computing and networking that have been made in recent years have led to vigorous development of the online multimedia industry. Take the fast-growing online game industry for example. Player Unknown's Battle Grounds (PUBG) is a First Personal Shooting (FPS) game which became popular in 2017. Counter Strike (CS) is another FPS game released in 2019, which has more quest and strategy elements than PUBG, transforming it from an FPS game focusing simply on shooting the enemies in sight into a more complicated scenario involving disarming traps and rescuing hostages. A report released by the video game statistics website GitHyp in 2018 shows that PUBG became one of the most popular online games, with 50 million players around the world, and as such, PUBG players are motivated to improve their gaming skills associated with character and strategy proficiency to increase the odds of winning for the teams they joined.

Specifically, PUBG is a team-based FPS game. Each team includes multiple players which serve in different roles and have different duties, and the teammates all share the same goal, i.e., the survival of the team. Therefore, finding teammates with complementary advantages is crucial to lift the team's performance. The same requirement goes for other team-based online games as well. However, conventional practices of teammate recommendation usually select the recommendation candidates randomly or based on the candidates' locations, and the recommendation results often fail to satisfy the players' need to build a solid team. As a result, user experience of the team-based online games may be degraded.

BRIEF SUMMARY OF THE APPLICATION

The present application proposes a teammate recommendation method for a multiplayer online game, which comprises the following steps: determining one or more characteristic values for each of a plurality of players based on past game performance information of the players; dividing the players into a plurality of groups based on the characteristic values of the players; determining a Key Performance Indicator (KPI) for each of a plurality of combinations of the groups based on teammate information and team ranking of each game in the past game performance information; selecting one of the combinations, which includes a first group that the first player belongs to, based on the KPIs of the combinations; and recommending one or more second players based on the selected combination.

In one example, the determination of the characteristic values comprises: determining per-game statistics for each of the players based on one or more parameters in the past game performance information; combining multiple parameters in the past game performance information to obtain compound statistics for each of the players; and determining weighted statistics for each of the players based on the per-game statistics and the compound statistics.

In one example, the multiplayer online game is a First Personal Shooting (FPS) game, and the parameters in the past game performance information comprise at least one of the following: a game session number; a player number; a team number; a session time; a death time; an assist count; an attack count; a kill count; a head kill count; a battle kill count; a kill count ranking; a maximum kill distance; an indicator of whether maximum damage is done using a sniper rifle; a swimming distance; a walking distance; a total damage volume; a total damage count; a counter strike hit; and a counter strike count.

In one example, the per-game statistics comprise at least one of the following: a per-game assist count for each player, which is determined based on the assist count of each player in each game; a per-game attack count for each player, which is determined based on the attack count of each player in each game; a per-game kill count for each player, which is determined based on the kill count of each player in each game; a per-game head kill count for each player, which is determined based on the head kill count of each player in each game; a per-game battle kill count for each player, which is determined based on the battle kill count of each player in each game; a per-game kill count ranking for each player, which is determined based on the kill count ranking of each player in each game; a per-game maximum kill distance for each player, which is determined based on the maximum kill distance of each player in each game; a per-game indicator of whether maximum damage is done by each player using a sniper rifle, which is determined based on the indicator of each player in each game; a per-game swimming distance by each player, which is determined based on the swimming distance of each player in each game; a per-game walking distance by each player, which is determined based on the walking distance of each player in each game; a per-game total damage volume for each player, which is determined based on the total damage volume of each player in each game; a per-game total damage count for each player, which is determined based on the total damage count of each player in each game; a per-game counter strike hit for each player, which is determined based on the counter strike hit of each player in each game; and a per-game counter strike count for each player, which is determined based on the counter strike count of each player in each game.

In one example, the compound statistics comprise at least one of the following: a moving distance for each player, which is determined based on the per-game swimming distance and the per-game walking distance of each player in each game; a single-hit damage volume for each player, which is determined based on the per-game total damage volume and the per-game total damage count of each player in each game; and a counter strike rate for each player, which is determined based on the per-game counter strike hit and the per-game counter strike count of each player in each game.

In one example, the weighted statistics comprise at least one of the following: a sniper attribute for each player, which is determined based on the per-game maximum kill distance and the single-hit damage volume of each player in each game; and a fragger attribute for each player, which is determined based on the per-game total damage volume, the per-game head kill count, the per-game kill count ranking, the per-game battle kill count, the per-game kill count, and the per-game total damage count for each player in each game.

In one example, the recommendation of the second players based on the selected combination comprises: determining remaining groups other than the first group in the selected combination; and recommending one player with the highest KPI or a plurality of players with higher KPIs in each of the remaining groups.

In one example, the teammate recommendation method further comprises: determining whether a number of the recommended players in each of the remaining groups is under a predetermined threshold; and in response to the number of the recommended players in each of the remaining groups being under the predetermined threshold, recommending more players from the remaining players in each of the remaining groups based on secondary groups to which the remaining player belong.

In one example, the characteristic values comprise the per-game statistics, the compound statistics, and the weighted statistics, and the division of the players into groups comprises: using a clustering algorithm to analyze the characteristic values, thereby determining cluster center values of the groups; determining probabilities that each player belongs to each of the groups based on the characteristic values and the cluster center values; and selecting the group with the highest probability to be a primary group for each player, and the other groups as secondary groups sorted by the corresponding probabilities for each player.

In one example, the teammate recommendation method further comprises: determining a primary group and a secondary group to which each player belongs, based on the group to which each player belongs in each game.

Other aspects and features of the present application will become apparent to those with ordinary skill in the art upon review of the following descriptions of specific embodiments of the teammate recommendation method.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
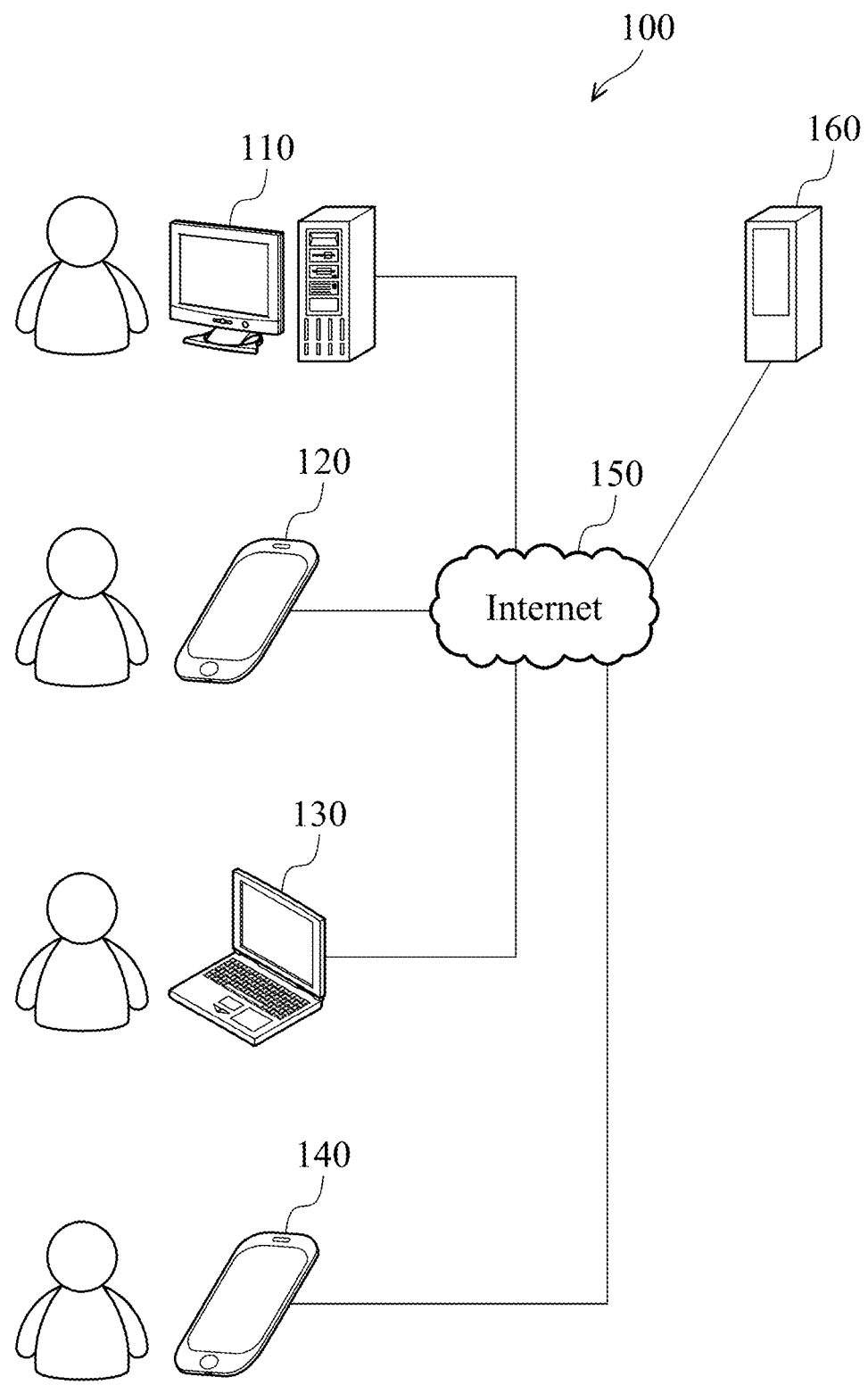
FIG. 1 is a block diagram of a network environment according to an embodiment of the application.

FIG. 1 is a block diagram of a network environment according to an embodiment of the application.

As shown in FIG. 1, the network environment 100 includes multiple gaming consoles 110~140, the Internet 150, and a game server 160. Each of the gaming consoles 110~140 is operated by a respective user, and is connected to the Internet 150 via wired or wireless connection(s) and further connected to the game server 160 via the Internet 150 to join a multi-user online game, such as an FPS game (e.g., PUBG, H1Z1, CS, etc.).

Each of the gaming consoles 110~140 may be a Personal Computer (PC), a smartphone, a panel PC, a laptop computer, or any electronic computing device capable of network communication and running the multi-user online game.

For example, the gaming console 110 may be a PC which is installed with the PUBG application and connected to the Internet 150 via a local area network (e.g., an Ethernet or Wireless-Fidelity (Wi-Fi) network). The gaming consoles 120 and 140 may each be a smartphone or panel PC which is installed with the PUBG application and connected to the Internet 150 via a local area network (e.g., an Wi-Fi network) or a mobile communication network (e.g., a 4G/5G network). The gaming console 130 may be a laptop computer which is installed with the PUBG application and connected to the Internet 150 via a local area network (e.g., an Ethernet or Wi-Fi network).

The game server 160 is a computer server with network communication function, which is responsible for providing a platform for multi-user online games. In particular, the game server 160 may keep the past game performance information of each player (e.g., store the past game performance information in a database), and analyze the past game performance information to determine the role (e.g., sniper, fragger, supporter, or others) of each player and to recommend the most suitable roles of teammates for a player. Advantageously, the player may be able to find teammates with complementary advantages, thereby improving the team's performance and increasing the odds of winning for the team.

Figure 2:
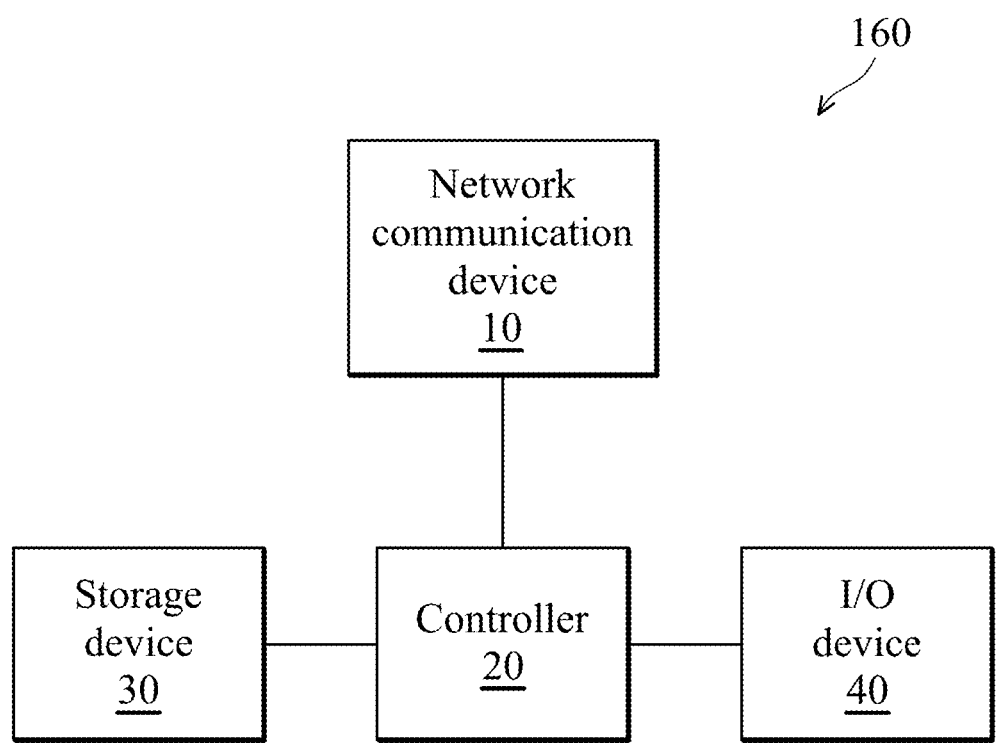
FIG. 2 is a block diagram illustrating the game server 160 according to an embodiment of the application.

FIG. 2 is a block diagram illustrating the game server 160 according to an embodiment of the application.

As shown in FIG. 2, the game server 160 may include a network communication device 10, a controller 20, a storage device 30, and an Input/Output (I/O) device 40.

The network communication device 10 is configured to use at least one network communication technology (e.g., the Ethernet, Wi-Fi, or Long Term Evolution (LTE) technology) to provide wired or wireless connection(s) to the Internet 150 and the gaming consoles 110~140 via the Internet 150.

For example, the network communication device 10 may include a network interface card (e.g., an Ethernet or Fiber Ethernet adapter) for providing wired connection(s). Alternatively, the network communication device 10 may include a wireless communication chip for providing wireless connection(s). The wireless communication chip may include a baseband processing device, a Radio Frequency (RF) device, and an antenna. The baseband processing device may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device may receive RF wireless signals via the antenna, convert the received RF wireless signals to baseband signals, which are processed by the baseband processing device, or receive baseband signals from the baseband processing device and convert the received baseband signals to RF wireless signals, which are later transmitted via the antenna. The RF device may also contain multiple hardware devices to perform radio frequency conversion. For example, the RF device may include a mixer to multiply the baseband signals with a carrier oscillated in the radio frequency of the supported Radio Access Technologies (RATs), wherein the radio frequency may be 2.4 GHz or 5 GHz utilized in Wi-Fi systems, or may be 900 MHz, 2100 MHz, or 2.6 GHz utilized in 4G (e.g., LTE/LTE-A/TD-LTE) systems, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the network communication device 10 for connecting to the Internet 150, enabling the storage device 30 for storing and retrieving data (e.g., past game performance information of each player), and receiving/outputting signals from/to the I/O device 40.

In particular, the controller 20 coordinates the aforementioned operations of the network communication device 10, the storage device 30, and the I/O device 40 for performing the teammate recommendation method for a multiplayer online game.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. More specifically, the controller 20 may include three components, including a control unit, an Arithmetic Logic Unit (ALU), and a register, but the application is not limited thereto. The control unit is responsible for controlling function executions according the instructions in program code. The ALU is responsible for performing arithmetic and bitwise operations on integer binary numbers. The register may be realized with a single piece of hardware to store data for arithmetic and bitwise operations and instructions to be executed by the control unit, or may be realized with two independent pieces of hardware to separately store data for arithmetic and bitwise operations and instructions to be executed by the control unit.

The storage device 30 is a non-transitory computer-readable storage medium be a memory (e.g., a FLASH memory or a Non-Volatile Random Access Memory (NVRAM)), a magnetic storage device (e.g., a hard disk or a magnetic tape), an optical disc, or any combination thereof for storing data, including past game performance information of each player, computer-readable instructions and/or program code of applications, an Operating System (OS), and/or the teammate recommendation method for a multiplayer online game.

The I/O device 40 may include one or more buttons, a light emission device, a keyboard, a mouse, a touch pad, a display device (e.g., a Liquid-Crystal Display (LCD), a Light-Emitting Diode (LED) display, or an Electronic Paper Display (EPD), etc.), a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, the game server 160 may include more components, such as a display device (e.g., LCD, LED display, or EPD, etc.).

Figure 3:
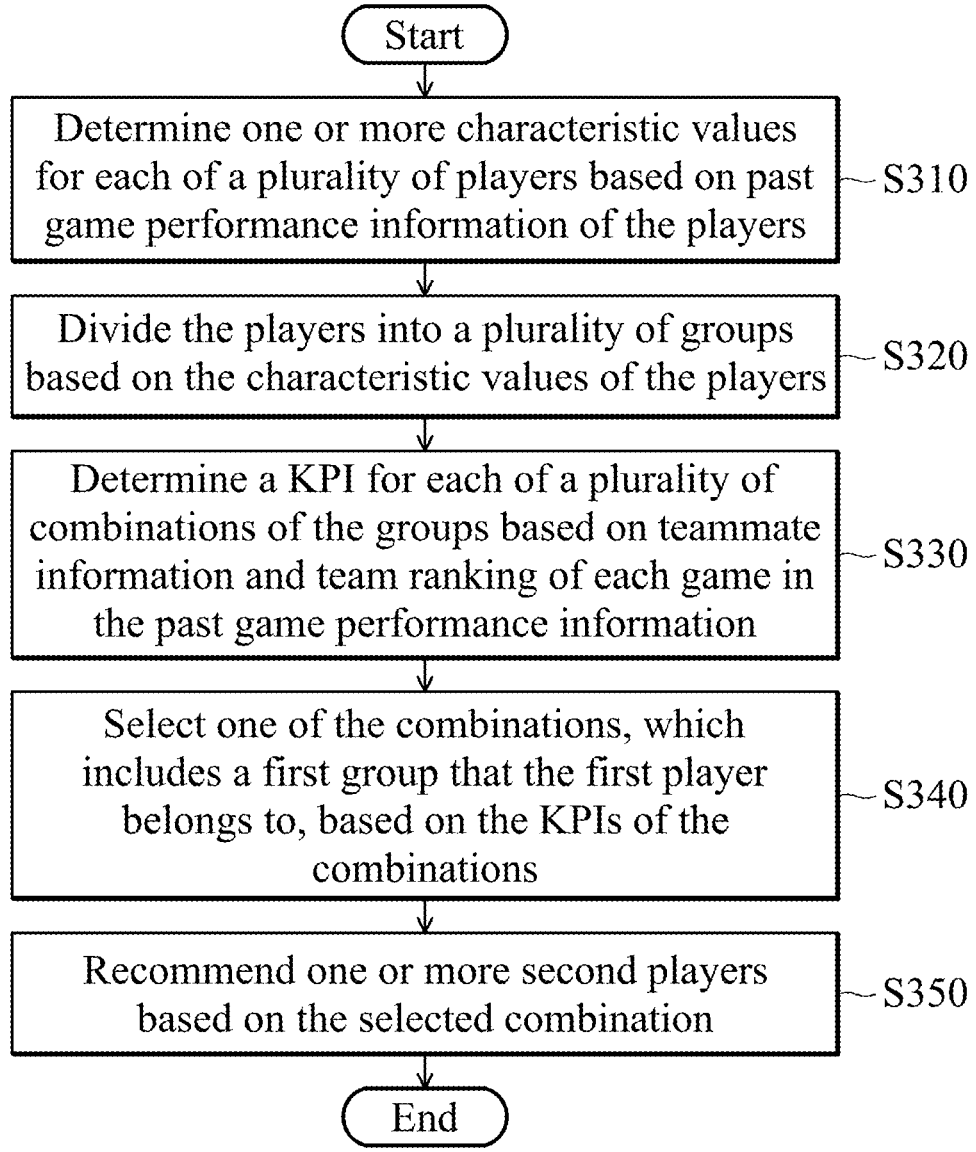
FIG. 3 is a flow chart illustrating the teammate recommendation method for a multiplayer online game according to an embodiment of the application.

FIG. 3 is a flow chart illustrating the teammate recommendation method for a multiplayer online game according to an embodiment of the application.

In this embodiment, the teammate recommendation method is applied to and executed by a game server (e.g., the game server 160). Alternatively, in other embodiments, the teammate recommendation method may be applied to and executed by a gaming console (e.g., the gaming console 110/120/130/140) instead if the gaming console is authorized to access the database in the game server to obtain the past game performance information of the other players.

In step S310, the game server determines one or more characteristic values for each of a plurality of players based on past game performance information of the players.

In step S320, the game server divides the players into a plurality of groups based on the characteristic values of the players.

In step S330, the game server determines a Key Performance Indicator (KPI) for each of a plurality of combinations of the groups based on teammate information and team ranking of each game in the past game performance information.

In step S340, the game server selects one of the combinations, which includes a first group that the first player belongs to, based on the KPIs of the combinations.

In step S350, the game server recommends one or more second players based on the selected combination.

The detailed description of steps S310~S350 will be further illustrated in FIGS. 4~8, respectively, as follows.

Figure 4:
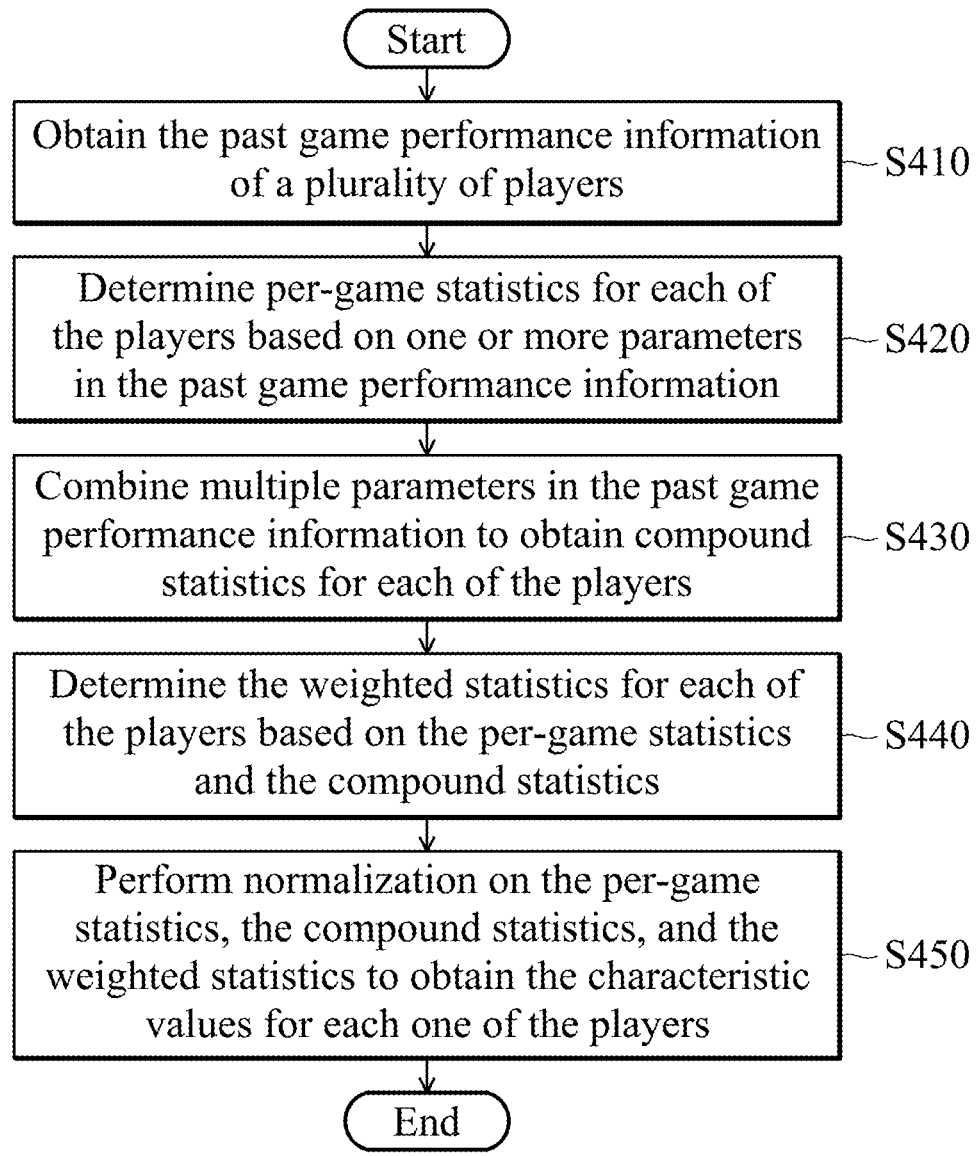
FIG. 4 is a detailed flow chart illustrating the determination of the characteristic values for players in step S310 according to an embodiment of the application.

FIG. 4 is a detailed flow chart illustrating the determination of the characteristic values for players in step S310 according to an embodiment of the application.

In step S410, the game server obtains the past game performance information of a plurality of players.

In one embodiment, the past game performance information of the players may be obtained from the database of the game server. The past game performance information of each player may include at least one of the following parameters: a game session number, a player number, a team number, a session time, a death time, an assist count, an attack count, a kill count, a head kill count, a battle kill count, a kill count ranking, a maximum kill distance, an indicator of whether maximum damage is done using a sniper rifle, a swimming distance, a walking distance, a total damage volume, a total damage count, a counter strike hit, and a counter strike count.

In one embodiment, the past game performance information of multiple players may be organized as shown below in table 1, but the present application should not be limited thereto.

TABLE 1

| game session no. | player no. | session time | assist count | kill count | ... |
|---|---|---|---|---|---|
| M1 | P1 | Oct. 4, 2019 14:56:49.000 | 10 | 2 | ... |
| M2 | P1 | Oct. 3, 2019 14:56:49.000 | 5 | 3 | ... |
| M2 | P2 | Oct. 3, 2019 14:56:49.000 | 20 | 10 | ... |
| . | . | . | . | . | . |
| . | . | . | . | . | . |
| . | . | . | . | . | . |

In step S420, the game server determines per-game statistics for each of the players based on one or more parameters in the past game performance information.

For example, in PUBG, a player's survival time has certain relevance to the player's characteristics (e.g., the longer a player survives, the more assist count the player may have). Therefore, survival time may be used as a weighting base to calculate the per-game assist count of each player using the following equation.

$$\text{per-game assist count} = \frac{\sum_{i=1}^{N} timeSurvived_i \times assists_i}{\sum_{i=1}^{N} timeSurvived_i} \quad (1)$$

In equation (1), $timeSurvived_i$ represents the survival time of the player in the i-th game (i.e., the game with session number=i), $assist_i$ represents the assist count of the player in the i-th game, and N represents the total number of games that the player joined.

Other per-game statistics, such as a per-game assist count, a per-game attack count, a per-game kill count, a per-game head kill count, a per-game battle kill count, a per-game kill count ranking, a per-game maximum kill distance, a per-game indicator of whether the maximum damage is done using a sniper rifle, a per-game swimming distance, a per-game walking distance, a per-game total damage volume, a per-game total damage count, a per-game counter strike hit, and a per-game counter strike count, etc., may be calculated using equations similar to equation (1), and the present application should not be limited thereto.

In step S430, the game server combines multiple parameters in the past game performance information to obtain compound statistics for each of the players.

For example, the moving distance of a player may be determined based on the per-game swimming distance and the per-game walking distance by the player in each game (e.g., moving distance=per-game swimming distance+per-game walking distance).

For example, the single-hit damage volume of a player may be determined based on the per-game total damage volume and the per-game total damage count for the player in each game (e.g., single-hit damage volume=per-game total damage volume÷per-game total damage count).

For example, the counter strike rate of a player may be determined based on the per-game counter strike hit and the per-game counter strike count for the player in each game (e.g., counter strike rate=per-game counter strike hit÷per-game counter strike count).

In step S440, the game server determines the weighted statistics for each of the players based on the per-game statistics and the compound statistics.

For example, a Multivariate Statistical Analysis (MSA) approach, such as the Principal Component Analysis (PCA), may be used to aggregate the per-game statistics and the compound statistics to obtain the weighted statistics. If the PCA approach is used, the first principal component (PC1) is defined as the sniper attribute which may be calculated as follows: sniper attribute=(0.707*per-game maximum kill distance)+(0.500*single-hit damage volume). The greater PC1 value a player has may suggest that the player's strength is in long distance shooting with high single-hit damage. In addition, more principal components may be determined, e.g., a second principal component (PC2) may be defined as the fragger attribute which may be calculated as follows: fragger attribute=(0.420×per-game total damage volume)+(0.407×per-game head kill count)−(0.391*per-game kill count ranking)+(0.391×per-game battle kill count)+(0.428×per-game kill count)+(0.410×per-game total damage count), but the present application should not be limited thereto. The greater PC2 value a player has may suggest that the player's strength is in close combat.

In step S450, the game server performs normalization on the per-game statistics, the compound statistics, and the weighted statistics to obtain the characteristic values for each of the players. That is, the characteristic values in step S310 may include any combination of the per-game statistics, the compound statistics, and the weighted statistics.

For example, the normalization process may defined as:

$$\frac{(\text{statistics-}x \text{ of player-}i - \text{average of statistics-}x \text{ of all player})}{\text{standard deviation of statistics-}x}.$$

In one example, the characteristic values obtained from the normalization process may be presented as shown below in table 2, but the present application should not be limited thereto.

TABLE 2

| player no. | sniper attribute | other attack attribute | whether max damage is done with sniper rifle | counter strike rate | moving distance |
|---|---|---|---|---|---|
| P1 | 1.002 | 0.845 | −0.145 | 1.116 | −0.003 |
| P2 | 10 | 2 | 1 | 0.95 | 5 |
| . | . | . | . | . | . |
| . | . | . | . | . | . |

Figure 5:
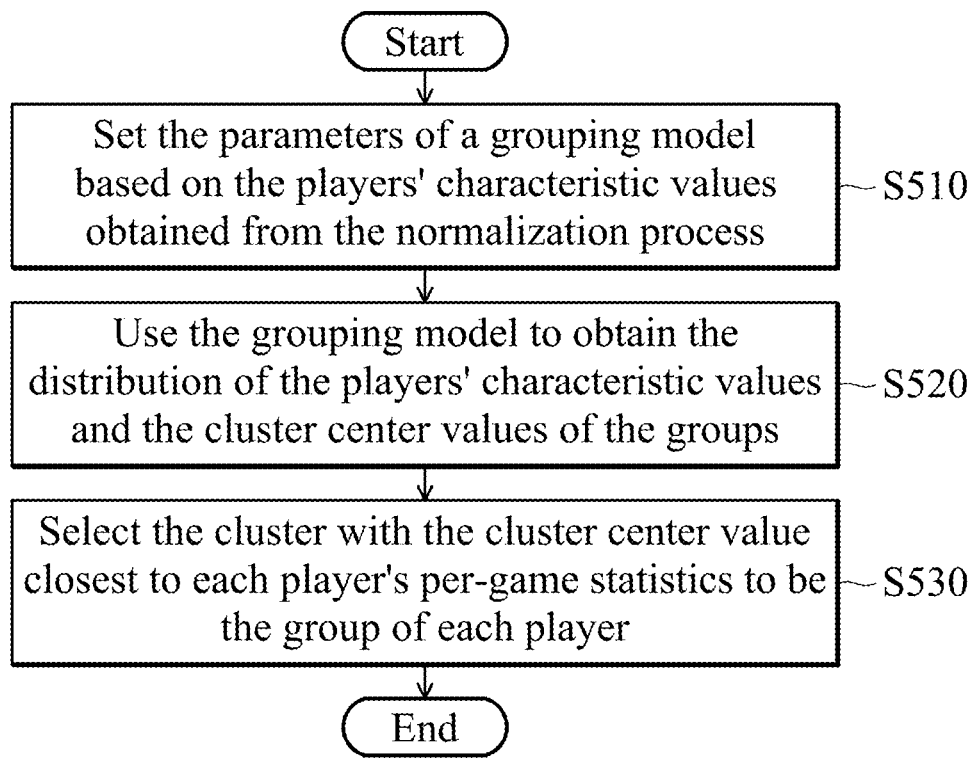
FIG. 5 is a detailed flow chart illustrating the division of players into groups in step S320 according to an embodiment of the application.

FIG. 5 is a detailed flow chart illustrating the division of players into groups in step S320 according to an embodiment of the application.

In step S510, the game server sets the parameters of a grouping model based on the players' characteristic values obtained from the normalization process (as shown in table 2).

For example, the grouping model may use a clustering algorithm (e.g., the K-means clustering algorithm, the hierarchical clustering algorithm, the Gaussian Mixture Model (GMM) algorithm, or others), with the number of groups, K, being set to the number of roles of players in the game. In one example, K is set to 4, representing four different roles—sniper, fragger, supporter, and others (i.e., neither of sniper, fragger, or supporter).

In step S520, the game server uses the grouping model to obtain the distribution of the players' characteristic values and the cluster center values of the groups.

In one example, the cluster center values (denoted as C1~C4) obtained from the grouping model may be presented as shown below in table 3, but the present application should not be limited thereto.

TABLE 3

| characteristic | C1 | C2 | C3 | C4 |
|---|---|---|---|---|
| sniper attribute | 0.952 | −0.191 | −0.652 | 0.473 |
| other attack attribute | 1.167 | −0.180 | −0.612 | 0.158 |
| whether max damage is done with sniper rifle | −0.248 | 0.146 | −0.552 | 1.246 |
| counter strike rate | 1.311 | −0.335 | −0.379 | −0.332 |
| moving distance | −0.173 | 1.677 | −0.475 | −0.228 |

In step S530, the game server selects the cluster with the cluster center value closest to each player's per-game statistics (i.e., the cluster that each player belongs to with the highest probability) to be the group of each player.

Taking player P1 in table 2 as an example, the player's distance to the center of cluster C1 may be calculated with the following equation.

$$\sqrt{\begin{array}{c}(1.002 - 0.952)^2 + (0.845 - 1.167)^2 + (-0.145 + 0.248)^2 + \\ (1.116 - 1.311)^2 + (-0.003 + 0.173)^2\end{array}}$$

The player P1's distance to the centers of clusters C2~C4 may be obtained as well by similar calculations. Therefore, the probability that the player P1 belonging to cluster C1 equals:

$$\frac{\frac{1}{0.429}}{\frac{1}{0.429} + \frac{1}{2.736} + \frac{1}{2.735} + \frac{1}{2.199}} = 0.67.$$

After the calculations, each player's grouping statistics may be organized as shown below in table 4, but the present application should not be limited thereto.

TABLE 4

| player no. | distance to C1 | distance to C2 | distance to C3 | distance to C4 | probability of belonging to each cluster (C1, C2, C3, C4) | belonging cluster |
|---|---|---|---|---|---|---|
| P1 | 0.429 | 2.736 | 2.735 | 2.199 | (0.67, 0.10, 0.10, 0.13) | C1 |
| ... | ... | ... | ... | ... | ... | ... |

Figure 6:
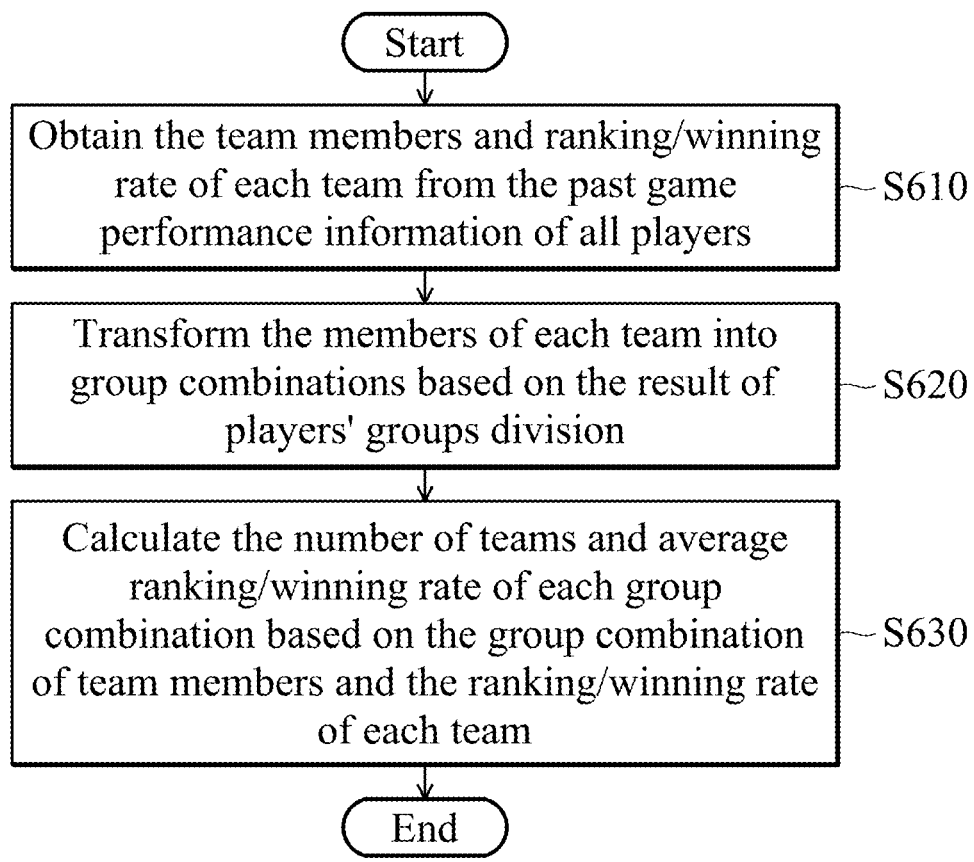
FIG. 6 is a detailed flow chart illustrating the KPI determination for each group combination in step S330 according to an embodiment of the application.

FIG. 6 is a detailed flow chart illustrating the KPI determination for each group combination in step S330 according to an embodiment of the application.

In step S610, the game server obtains the team members and ranking/winning rate of each team from the past game performance information of all players.

In one example, the team members and ranking/winning rate of each team may be organized as shown below in table 5, but the present application should not be limited thereto.

TABLE 5

| game session no. | team no. | teammate 1 | teammate 2 | teammate 3 | teammate 4 | ranking |
|---|---|---|---|---|---|---|
| M1 | R1 | P1 | P2 | P3 | P4 | 10 |
| M1 | R2 | P5 | P6 | P7 | P8 | 1 |
| M2 | R1 | P1 | P3 | P5 | P7 | 2 |
| . | . | . | . | . | . | . |
| . | . | . | . | . | . | . |
| . | . | . | . | . | . | . |

In step S620, the game server transforms the members of each team in table 5 into group combinations based on the result of players' groups division in step S320.

In one example, the group combinations of each team may be presented as shown below in table 6, and the present application should not be limited thereto.

TABLE 6

| game session no. | team no. | group combination | ranking |
|---|---|---|---|
| M1 | R1 | C1,C1,C3,C4 | 10 |
| M1 | R2 | C1,C1,C3,C4 | 1 |
| M2 | R1 | C1,C1,C3,C3 | 2 |
| . | . | . | . |
| . | . | . | . |

In step S630, the game server calculates the number of teams and average ranking/winning rate of each group combination based on the group combination of team members and the ranking/winning rate of each team.

Taking the grouping into clusters C1~C4 as mentioned earlier as example, there are $C_4^7=35$ combinations in total, and the number of teams and average ranking/winning rate of each group combination may be presented as shown below in table 7, but the present application should not be limited thereto.

TABLE 7

| C1 | C2 | C3 | C4 | number of teams | average ranking |
|---|---|---|---|---|---|
| 2 | 0 | 1 | 1 | 20 | 2.5 |
| 1 | 1 | 1 | 1 | 30 | 4.8 |
| . | . | . | . | . | . |
| . | . | . | . | . | . |
| . | . | . | . | . | . |

Note that the statistics in table 7 is sorted in a decreasing order based on the average ranking of each group combination.

Figure 7:
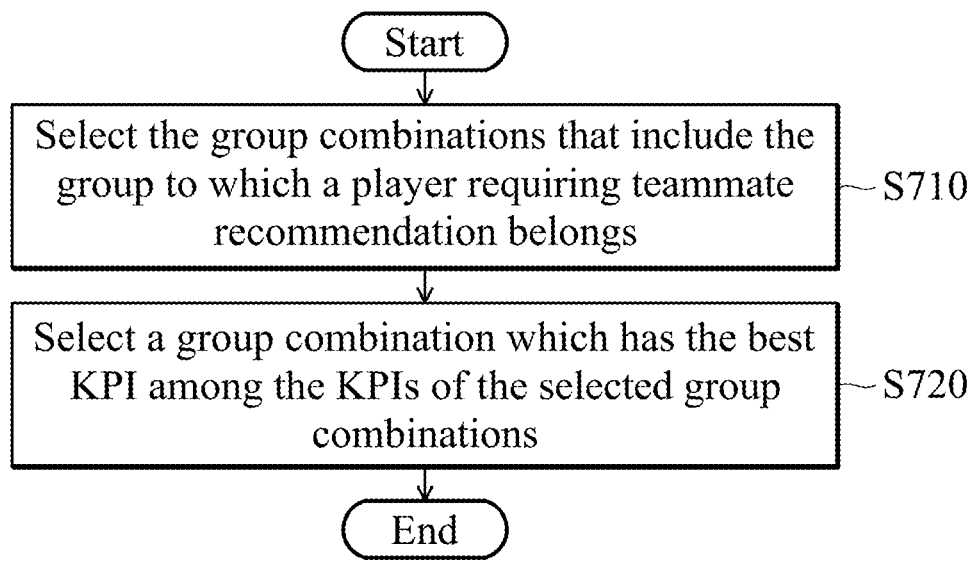
FIG. 7 is a detailed flow chart illustrating the determination of the best group combination for a player in step S340 according to an embodiment of the application.

FIG. 7 is a detailed flow chart illustrating the selection of the best group combination for a player in step S340 according to an embodiment of the application.

In step S710, the game server selects the group combinations that include the group to which a player requiring teammate recommendation belongs.

In step S720, the game server selects a group combination which has the best KPI among the KPIs of the selected group combinations.

For example, the player requiring teammate recommendation is player P100, and the characteristic values of the player may be obtained by performing the steps in FIG. 4. Player P100's characteristic values are shown below in table 8, but the present application should not be limited thereto.

TABLE 8

| player no. | sniper attribute | other attack attribute | whether max damage is done with sniper rifle | counter strike rate | moving distance |
|---|---|---|---|---|---|
| P100 | 1.002 | 0.845 | −0.145 | 1.116 | −0.003 |

After that, the group C1 to which player P100 belongs may be obtained by performing the steps in FIG. 5, and the group combination with the best KPI (e.g., ranking/winning rate) among the group combinations including group C1 may be selected, based on the statistics in table 7, to be {C1, C1, C3, C4}.

In step S820, the game server sorts the selected players in each remaining group by their average rankings.

In step S830, the game server determines whether the number of selected players in each remaining group is equal to or above the threshold N.

Subsequent to step S830, if the number of selected players in each remaining group is equal to or above the threshold N, the method proceeds to step S840. Otherwise, if the number of selected players in each remaining group is under the threshold N, the method proceeds to step S850.

In step S840, the game server generates a list of recommended players based on the average rankings of the selected players in each remaining group (i.e., recommends the players with higher average rankings in each remaining group).

In step S850, the game server calculates the number of lacked players in each remaining group (e.g., lacked 20 players in group C1, lacked 40 players in group C3, and lacked 0 player in group C4).

In step S860, the game server skips the players that have been recommended to player P100, and recommends the rest players based on the secondary groups they belong to.

Taking Table 4 as an example, the primary group of player P1 is group C1 (i.e., the group with the highest belonging probability), and the secondary group of player P1 is group C4 based on the order of the belonging probabilities.

Alternatively, the game server may determine the primary group and the secondary group for each player based on the different groups to which each player belongs to in different games. For example, the statistics in Table 6 may be used to determine the different groups to which a player belongs to in different games, thereby obtaining the list of belonging groups (may be interpreted as indicators of the player's personalities in games) for each player. The list of belonging groups for each player may be organized based on the percentages of games in which each player belongs to different groups as shown below in Table 9, but the present application should not be limited thereto.

TABLE 9

| player no. | number of games played | belong to group C1 | belong to group C2 | belong to group C3 | belong to group C4 | player's personality (1st, 2nd, 3rd, 4th) |
|---|---|---|---|---|---|---|
| P200 | 100 | 20% (20 games) | 50% (50 games) | 30% (30 games) | 0% (0 game) | (C2, C3, C1, C4) |
| P300 | 50 | 20% (10 games) | 30% (15 games) | 50% (25 games) | 0% (0 game) | (C3, C2, C1, C4) |
| . | . | . | . | . | . | . |
| . | . | . | . | . | . | . |
| . | . | . | . | . | . | . |

Figure 8:
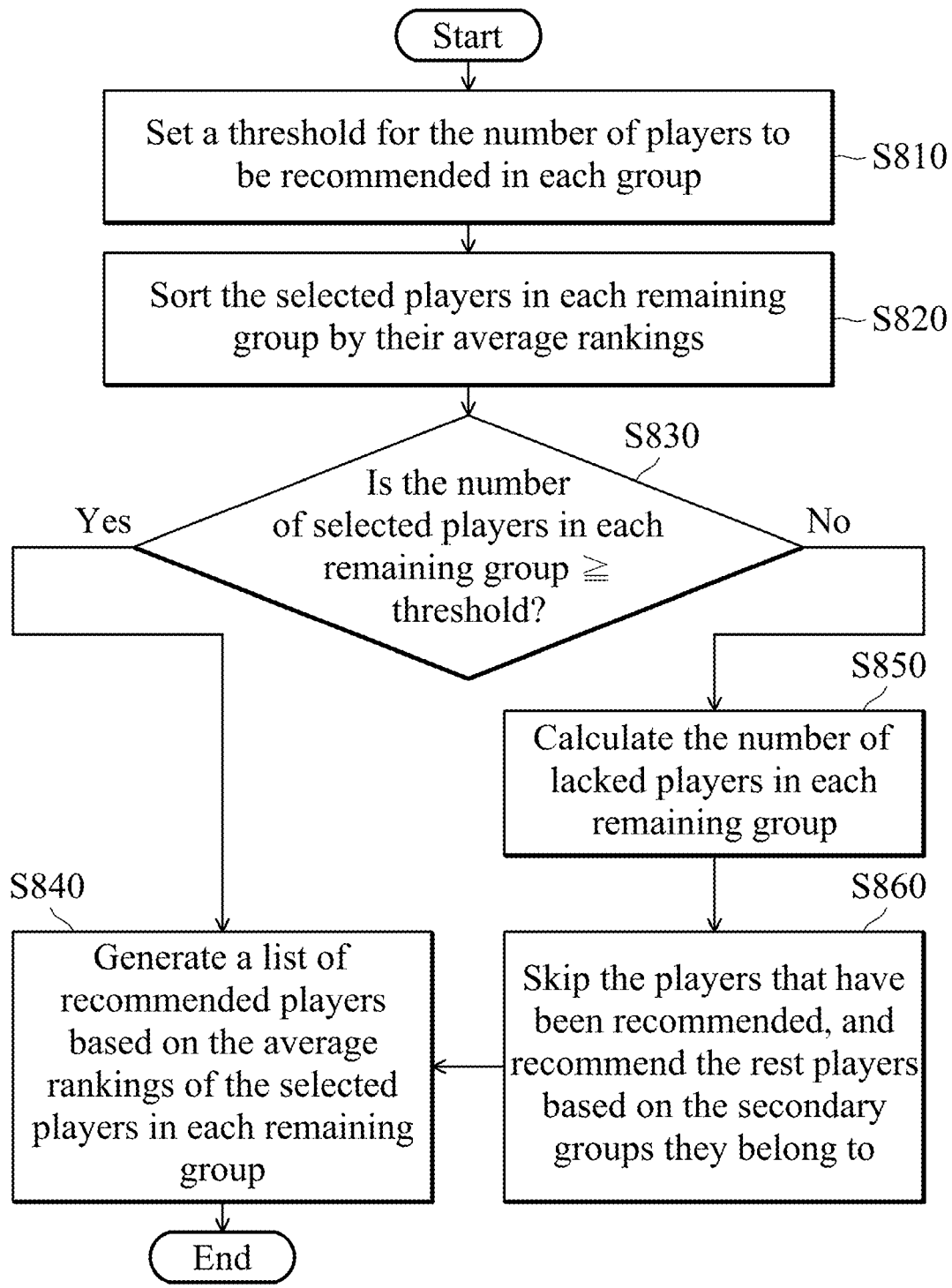
FIG. 8 is a detailed flow chart illustrating the player recommendation in step S350 according to an embodiment of the application.

FIG. 8 is a detailed flow chart illustrating the player recommendation in step S350 according to an embodiment of the application.

To begin with, in step S810, the game server sets a threshold N for the number of players to be recommended in each group.

For example, the best group combination for player P100 is {C1, C1, C3, C4}, and eliminating one group C1 to which player P100 belongs, the remaining groups in the group combination are groups C1, C3, and C4. Then, one (e.g., N=1) or more (e.g., N=50) players is/are to be selected from each of the remaining groups.

In view of the forgoing embodiments, it will be appreciated that the teammate recommendation method of the present application makes a good use of the past game performance information to obtain the players' characteristics and build an efficient grouping model for identifying the role of each player in the game, thereby recommending more suitable and competent teammates. In addition, the teammate recommendation method of the present application also takes the KPIs of the group combinations into account, so as to improve the advantage and winning rate of the entire team. For example, the KPIs may include various experience evaluation indicators, such as the winning rate, the resource scores, and/or the teammate reward points, and the present application should not be limited thereto.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A teammate recommendation method for a multiplayer online game, comprising:
   running the multi-user online game and connecting to a game server via an Internet via a gaming console;
   reading past game performance information of a plurality of players from a storage device of the game server via a controller of the game server;
   determining one or more characteristic values for each of a plurality of players based on past game performance information of the players via the controller;
   dividing the players into a plurality of groups based on the characteristic values of the players via the controller;
   determining a Key Performance Indicator (KPI) for each of a plurality of combinations of the groups based on teammate information and team ranking of each game in the past game performance information via the controller;
   selecting one of the combinations, which includes a first group that the first player belongs to, based on the KPIs of the combinations via the controller; and
   recommending one or more second players based on the selected combination via the controller;
   generating a list of the one or more second players via the controller;
   wherein the recommendation of the second players based on the selected combination comprises:
      determining remaining groups other than the first group in the selected combination; and
      recommending one player with the highest KPI or a plurality of players with higher KPIs in each of the remaining groups.

2. The teammate recommendation method as claimed in claim 1, wherein the determination of the characteristic values comprises:
   determining per-game statistics for each of the players based on one or more parameters in the past game performance information;
   combining multiple parameters in the past game performance information to obtain compound statistics for each of the players; and
   determining weighted statistics for each of the players based on the per-game statistics and the compound statistics.

3. The teammate recommendation method as claimed in claim 2, wherein the multiplayer online game is a First Personal Shooting (FPS) game, and the parameters in the past game performance information comprise at least one of the following:

a game session number;
a player number;
a team number;
a session time;
a death time;
an assist count;
an attack count;
a kill count;
a head kill count;
a battle kill count;
a kill count ranking;
a maximum kill distance;
an indicator of whether maximum damage is done using a sniper rifle;
a swimming distance;
a walking distance,
a total damage volume;
a total damage count;
a counter strike hit; and
a counter strike count.

4. The teammate recommendation method as claimed in claim 3, wherein the per-game statistics comprise at least one of the following:
   a per-game assist count for each player, which is determined based on the assist count of each player in each game;
   a per-game attack count for each player, which is determined based on the attack count of each player in each game;
   a per-game kill count for each player, which is determined based on the kill count of each player in each game;
   a per-game head kill count for each player, which is determined based on the head kill count of each player in each game;
   a per-game battle kill count for each player, which is determined based on the battle kill count of each player in each game;
   a per-game kill count ranking for each player, which is determined based on the kill count ranking of each player in each game;
   a per-game maximum kill distance for each player, which is determined based on the maximum kill distance of each player in each game;
   a per-game indicator of whether maximum damage is done by each player using a sniper rifle, which is determined based on the indicator of each player in each game;
   a per-game swimming distance by each player, which is determined based on the swimming distance of each player in each game;
   a per-game walking distance by each player, which is determined based on the walking distance of each player in each game;
   a per-game total damage volume for each player, which is determined based on the total damage volume of each player in each game;
   a per-game total damage count for each player, which is determined based on the total damage count of each player in each game;
   a per-game counter strike hit for each player, which is determined based on the counter strike hit of each player in each game; and
   a per-game counter strike count for each player, which is determined based on the counter strike count of each player in each game.

5. The teammate recommendation method as claimed in claim 4, wherein the compound statistics comprise at least one of the following:
- a moving distance for each player, which is determined based on the per-game swimming distance and the per-game walking distance of each player in each game;
- a single-hit damage volume for each player, which is determined based on the per-game total damage volume and the per-game total damage count of each player in each game; and
- a counter strike rate for each player, which is determined based on the per-game counter strike hit and the per-game counter strike count of each player in each game.

6. The teammate recommendation method as claimed in claim 5, wherein the weighted statistics comprise at least one of the following:
- a sniper attribute for each player, which is determined based on the per-game maximum kill distance and the single-hit damage volume of each player in each game; and
- a fragger attribute for each player, which is determined based on the per-game total damage volume, the per-game head kill count, the per-game kill count ranking, the per-game battle kill count, the per-game kill count, and the per-game total damage count for each player in each game.

7. The teammate recommendation method as claimed in claim 2, wherein the characteristic values comprise the per-game statistics, the compound statistics, and the weighted statistics, and the division of the players into groups comprises:
- using a clustering algorithm to analyze the characteristic values, thereby determining cluster center values of the groups;
- determining probabilities that each player belongs to each of the groups based on the characteristic values and the cluster center values; and
- selecting the group with the highest probability to be a primary group for each player, and the other groups as secondary groups sorted by the corresponding probabilities for each player.

8. The teammate recommendation method as claimed in claim 1, further comprising:
- determining whether a number of the recommended players in each of the remaining groups is under a predetermined threshold; and
- in response to the number of the recommended players in each of the remaining groups being under the predetermined threshold, recommending more players from the remaining players in each of the remaining groups based on secondary groups to which the remaining player belong.

9. The teammate recommendation method as claimed in claim 8, further comprising:
- determining a primary group and a secondary group to which each player belongs, based on the group to which each player belongs in each game.

\* \* \* \* \*